(12) United States Patent
D'Ambrosio

(10) Patent No.: US 7,809,661 B2
(45) Date of Patent: Oct. 5, 2010

(54) MODELING AND AUTOMATIC FILTERING/TRACKING REAL-TIME EVENTS USING DYNAMIC RELATIONAL BAYESIAN NETWORKS

(75) Inventor: Bruce D'Ambrosio, Seattle, WA (US)

(73) Assignee: Art Technology Group, Cambridge, MA (US)

( * ) Notice: Subject to any disclaimer, the term of this patent is extended or adjusted under 35 U.S.C. 154(b) by 639 days.

(21) Appl. No.: 11/543,728

(22) Filed: Oct. 4, 2006

(65) Prior Publication Data

US 2007/0219754 A1 Sep. 20, 2007

Related U.S. Application Data

(63) Continuation-in-part of application No. 11/398,853, filed on Apr. 5, 2006, now abandoned.

(60) Provisional application No. 60/668,376, filed on Apr. 5, 2005.

(51) Int. Cl.
G06F 17/00 (2006.01)
(52) U.S. Cl. ...................................................... 706/45
(58) Field of Classification Search ......... 702/188–190; 706/21, 45, 62; 705/3; 348/169
See application file for complete search history.

(56) References Cited

U.S. PATENT DOCUMENTS

2003/0117279 A1* 6/2003 Ueno et al. ................. 340/523
2004/0034795 A1* 2/2004 Anderson et al. ........... 713/201
2004/0103296 A1* 5/2004 Harp et al. .................. 713/200
2005/0033712 A1* 2/2005 D'Ambrosio ................. 706/52
2005/0069207 A1* 3/2005 Zakrzewski et al. .......... 382/190
2008/0168020 A1* 7/2008 D'Ambrosio ................. 706/50

OTHER PUBLICATIONS

Hongeng, Somboon; Nevatia, Ram; Bremond, Francois; "Video-based Event Recognition: Activity Representation and Probabilistic Recognition Methods"; Aug. 13, 2004 (available online); Elsevier; Computer Vision and Image Understanding 96 (2004); pp. 129-145.*
Sanghai et al., "Dynamic Probabilistic Relational Models", 2003, Proceedings of the Eighteenth International Joint Conference on Artificial Intelligence, pp. 992-997.*
Waltner, "Personalization tools help customers with purchases and let merchants cross sell", Jan. 29, 2001, InformationWeek.com, pp. 1-5.*
Bloemeke, et al., "A Hybrid Algorithm to Compute Marginal and Joint Beliefs in Bayesian Networks and Its Complexity," Conference on Uncertainty in Artificial Intelligence, (1998), pp. 16-23.
Boyen, et al., "Discovering the Hidden Structure of Complex Dynamic Systems," Conference on Uncertainty in Artificial Intelligence, (1999), pp. 91-100.

(Continued)

*Primary Examiner*—David R Vincent
(74) *Attorney, Agent, or Firm*—DLA Piper LLP US

(57) ABSTRACT

The present invention includes relation-Bayesian-network-based tracking methods. Various, distinct embodiments of the present invention include tracking methods for: real-time relational tracking of e-commerce segmentation and personalization, in-residence tracking of elderly and disabled people, real-time relational tracking for ground target tracking and real-time relational tracking of satellites and satellite constellations.

10 Claims, 8 Drawing Sheets

Qualitative graphical layer gives structure of the model
• Directed acyclic arcs
• Conditional independencies

| | |
|---|---|
| P(walking\|sensor_status: off, time_of_day: day) | .05 |
| P(walking\|sensor_status: off, time_of_day: night) | .05 |
| P(walking\|sensor_status: on, time_of_day: day) | .4 |
| P(walking\|sensor_status: on, time_of_day: night) | .3 |
| P(still\|sensor_status: off, time_of_day: day) | .05 |
| P(still\|sensor_status: off, time_of_day: night) | .05 |
| P(still\|sensor_status: on, time_of_day: day) | .05 |
| P(still\|sensor_status: on, time_of_day: night) | .05 |

Quantitative probabilistic layer contains:
• Marginal probabilities
• Conditional probabilities
• Joint probabilities

OTHER PUBLICATIONS

Crisan, D., et al., "A Survey of Convergence Results on Particle Filtering Methods for Practitioners," IEEE, Mar. 2002, vol. 50, No. 3, pp. 736-746.

Lauritzen, S., et al., "Local Computations with Probabilities on Graphical Structures and Their Application to Expert Systems," Journal of Royal Statistical Society, Series B (Methodological), (1988), vol. 50, No. 2, pp. 157-224.

Doucet, A., et al., "Rao-Blackwellised Particle Filtering for Dynamic Bayesian Networks," Proceedings of the 16th Conference on Uncertainty in Artificial Intelligence, (2000), Morgan Kaufmann Publishers Inc., pp. 176-183.

Kalman, R., et al., "A New Approach to Linear Filtering and Prediction Problems," Journal of Basic Engineering, 82 (Series D), (1960), pp. 35-45.

Kjaerulff, U., "A Computational Scheme for Reasoning in Dynamic Probabilistic Networks," Proceedings of the Eighth Conference on Uncertainty in Artificial Intelligence, (1992), Morgan Kaufmann Publishers, San Mateo, CA, pp. 121-129.

Li, Z., et al., "Efficient Inference In Bayes Networks as a Combinatorial Optimization Problem," Intl. J. of Approximate Reasoning, 11(1), (1994), pp. 58-81.

Marthi, B et al., "Decayed MCMC Filtering," Proceeding of the Proceedings of the Eighteenth Conference Annual Conference on Uncertainty in Artificial Intelligence (UAI-02), Morgan Kaufmann Publishers (2002), pp. 319-326.

Pearl, J., "Probabiistic Reasoning in Intelligent Systems: Network of Plausible Inference," Morgan Kaufmann Publishers (1988).

Takikawa, M., et al., "Real-Time Inference With Large-Scale Temporal Bayes Nets," UAI, Morgan Kaufmann Publishers (2002) pp. 477-484.

Yedidia, J., et al., "Generalized Belief Propagation," Advances in Neural Information Processing Systems (NIPS), (2000) vol. 13, pp. 689-695.

Shanghai, S., et al., "Dynamic Probabilistic Relational Models," Proceedings of the Eighteenth International Joint Conference on Artificial Intelligence, Mexico 2003, pp. 992-997.

* cited by examiner

MODELING AND AUTOMATIC FILTERING/TRACKING REAL-TIME EVENTS USING DYNAMIC RELATIONAL BAYESIAN NETWORKS

CROSS-REFERENCES TO RELATED APPLICATION

This application is a continuation-in-part of U.S. patent application Ser. No. 11/398,853, filed Apr. 5, 2006, which claims the benefit of U.S. Provisional Application No. 60/668,376, filed Apr. 5, 2005.

TECHNICAL FIELD

The present invention is directed to a method and system for tracking the behavior of people, objects, and events using relational Bayesian networks.

BACKGROUND OF THE INVENTION

Automated tracking of events, people, and objects has become an increasingly important goal for designers and developers of automated systems. During the past 20 years, significant research has been devoted to tracking-related topics. Currently available tracking methods and systems include classification methods, non-relational methods for data fusion and tracking, and research-related relational tracking methods. However, currently-available methods fall far short of the goals for automated tracking systems, including desired precision, accuracy, reliability, and robustness. Therefore, researchers, developers, and tracking system manufacturers and vendors have all recognized the need for new approaches to tracking.

SUMMARY OF THE INVENTION

The present invention includes relational Bayesian network-based tracking methods. Various, distinct embodiments of the present invention include tracking methods for: real-time relational tracking of e-commerce segmentation and personalization, in-residence tracking of elderly and disabled people, real-time relational tracking for ground target tracking, and real-time relational tracking of satellites and satellite constellations.

DETAILED DESCRIPTION OF THE INVENTION

Figure 1:
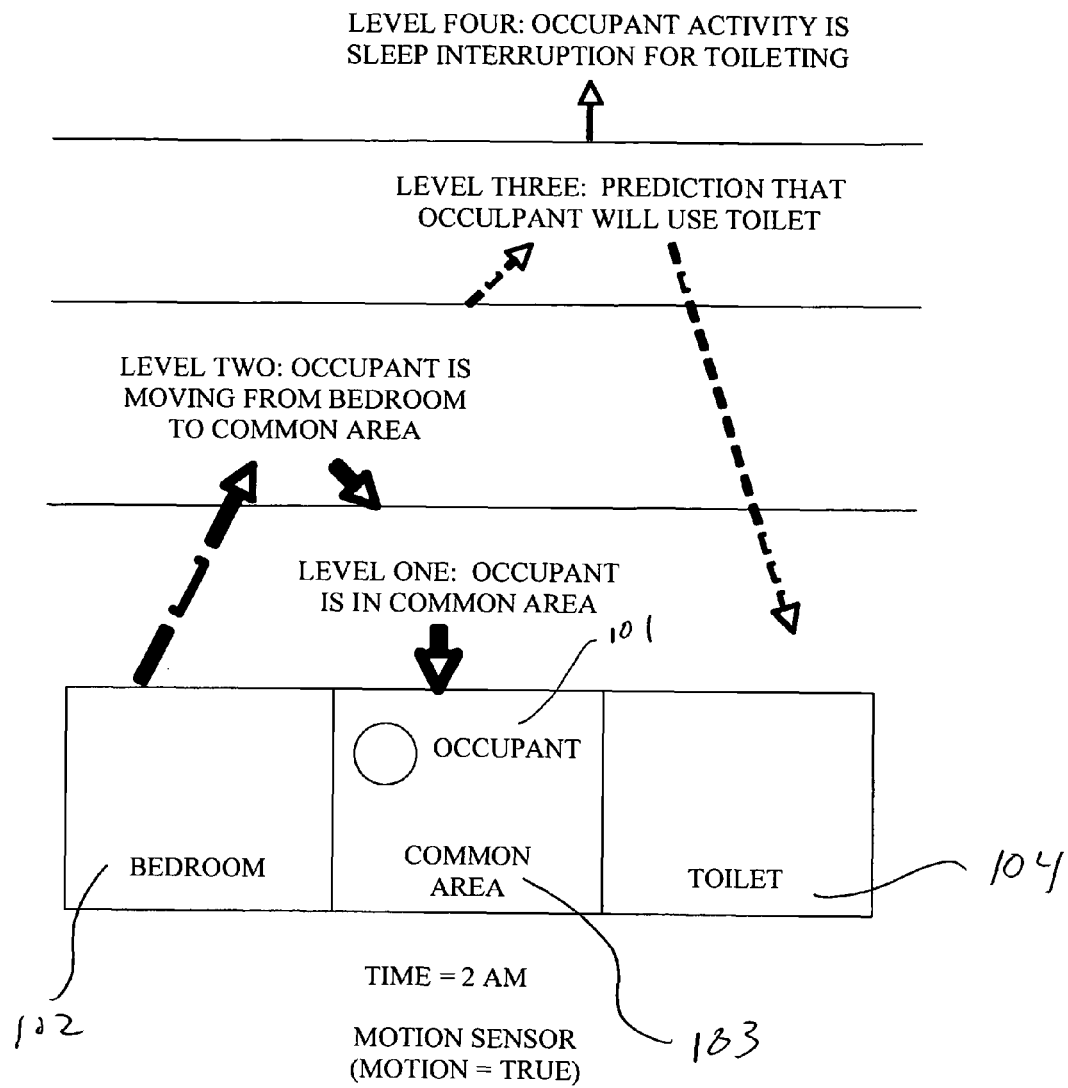
FIG. 1 illustrates a relational description.

Tracking the behavior of entities as they interact with their environment is a problem with applications in many domains. This document addresses four example domains: (1) real-time relational tracking for e-commerce segmentation and personalization; (2) in-residence tracking of elderly and disabled people; (3) real-time relational tracking for ground target tracking; and (4) real-time relational tracking of satellites and satellite constellations. In each of these applications, an important concern is the description of the behavior of the entity in question (a visitor to a website, a person moving through a residential space, a vehicle moving along the ground, or a satellite moving in space) by considering the relationships among the entity, other entities with which it interacts, and its environment.

In the domain of real-time relational tracking for ecommerce segmentation and personalization, a major concern is describing the behavior of a visitor to a website, following this behavior, and grouping with others who exhibit the same behavior over time (segmentation); and predicting what a visitor to a website will want to see next based on his or her previous behavior over time and interactions with products and pages on the website.

In the domain of in-residence tracking of individuals, a major concern is describing the behavior of a person as he or she moves through a residential space, based on the relationships among the individual, other individuals and objects in the space, and the configuration of the residence (i.e., the layout of rooms, fixtures and furniture) over time. Prediction of what a person will do next, allowing determination of the degree to which he or she is able to perform tasks, such as walking, toileting, dressing or taking medication. is sought. Such prediction allows, in turn, for an anticipatory response, such as closing a window or opening a door when the prediction is that the individual will enter the space under consideration.

In the domain of ground target tracking, an important concern is describing the behavior of a ground vehicle (i.e., an automobile, a truck, a tank or other vehicle), based on the vehicle's relationship with other vehicles, their attributes, and the configuration of the terrain that they are maneuvering upon. For example, given that there is a hole in the road, it might be expected that the vehicles will go around it. If the vehicles are following one another, it might be expected that a following vehicle to turn or proceed straight ahead depending on the behavior of the lead vehicle. By considering the behavior of other entities (i.e., the lead vehicle) and the environment (i.e., the hole in the road), prediction of where the vehicle in question will go next is possible.

In the domain of satellite tracking, a major concern is describing the behavior of the satellite, based on actual or potential interactions with other objects in space, such as other satellites and debris) as well as objects on the ground (such as lasers, which can be used to disable satellites). It is desired to track the satellites over time to discern their trajectories through space as they are affected by these entities, and also by their environment, including space weather and solar flares.

In all domains, sensor reports are generally noisy and unreliable. In the domain of in-residence tracking of individuals, for examples, sensors used to detect motion have uneven and possibly overlapping regions of coverage, and are prone to false alarms (e.g., being triggered by a wind-blown window curtain) and missed detections (e.g., below-threshold motions, low batteries, or communication failures). Light sensors can be triggered by changing shadows from sunlight. In both the physical and cyber worlds, available data are only indirectly related to actionable information (e.g. how is a signal from a noisy motion detector related to the possibility of a fall, an event for which we would like to alert caregivers.)

In the domain of real-time relational tracking for ecommerce segmentation and personalization, a corresponding question is how does the information that a visitor spent 25 seconds on the previous webpage inform the decision to show products of a similar brand? One view of this problem is as a classification task. In this view, the goal is to learn a rule that classifies various possible sensor inputs into categories, and associates an appropriate action with each category. For example, a simple electronic room light control can be viewed as a classification device: if the sensor output voltage is above 2 volts, turn on the room light; then if the sensor output voltage stays below 1 volt for more than 1 minute, turn off the light. Such simple classification schemes are widely used in medical instrument alerting, online advertising selection, and other applications. A basic limitation of this approach is the quality of the signal from the underlying sensor. Improved performance can be achieved through data fusion and tracking. That is, we can make a better decision by considering, not just the current sensor value, but also by considering data from multiple sensors and/or the past history of readings from the current sensor. Currently available include classification methods, non-relational methods for data fusion and tracking, and prior work in relational tracking. In the domain of in-residence tracking of individuals, for example, consider fusing information from multiple sensors in an elder-monitoring setting: if multiple light sensors report light at the same time, it may be sunlight coming in through the windows (the sun emerging from behind a cloud), rather than an indication of the occupant entering a specific room and turning on the room light.

Similarly, in the domain of real-time relational tracking for ecommerce segmentation and personalization, fusing information about a web visitor's connection speed with time of day can improve ad targeting. When the collection of sensor data is small enough, the collection can be treated as a single more complex sensor, and the classification techniques described earlier can be applied. This is the standard method used for web "behavioral targeting" advertising selection.

When the collection of sensor data to be fused is more complex, more formal model-based methods are usually applied. Bayesian networks (BNs) provide a compact way to describe the joint probability distribution over situation variables (Pearl, 1988), and so provide a natural and increasingly popular basis for sensor data fusion. The key limitation of all these methods is that they relate observables (e.g., voltage reading of a light sensor, seconds between page requests on a web-site) to unobservables of interest (e.g. is the occupant in the living room, is the visitor interested in cameras?) independently for each time-point, occupant, or web-visitor, and ignore any possible relationship among participants.

A class of currently available tracking methods include computing a current state estimate based on all previous sensor input, and updating that estimate as new data arrive (in statistical terms, filtering). When applied to following the location and orientation of physical entities in a military context, the term tracking is often used. Kalman filtering (Kalman, 1960) is the classic tracking algorithm for estimating location (in two or three dimensions) and heading of a moving object given a real-time stream of more-or-less accurate observations. Bayesian networks (BNs) provide a compact way to describe the joint probability distribution over situation variables (Pearl, 1988), and so provide a natural and increasingly popular basis for data fusion. Dynamic Bayesian networks (Boyen and Koller, 1999) extend BNs into dynamic domains and have been widely adopted for modeling and interpreting time-varying data in speech, robotics, target-tracking, and other domains (e.g., Crisan and Doucet, 2002). Takikawa (Takikawa et al, 2002) has studied methods for tracking using large-scale DBNs with simple hierarchical structure. Marthi (Marthi et al, 2002) has applied MCMC techniques to filtering (tracking) in DBNs. Particle filtering (Doucet et al, 2000) is a popular approach for low-dimensional problems such as location/orientation tracking.

Currently available methods may be adequate when there is a single entity to be tracked (e.g., tracking an individual within a household) and all the unknowns can be associated with that entity, or in which all entities are unrelated to one another, but do not permit modeling situations in which unknown parameters are distributed among multiple, interrelated entities. For example, imagine a motion sensor report from the apartment common area at 2 am. Simple tracking is sufficient to estimate that the occupant may now be in the common area. A more complete description is multi-level:

The occupant is in the common area
The occupant has moved from the bedroom to the common area
The occupant is about to use the toilet
The occupant is in a sleep-interruption-for-toileting.

FIG. 1 illustrates a relational description. There are four entities in the above description: (1) the occupant 101; (2) the bedroom 102; (3) the common-area 103; (4) the toilet 104; (5) a location entity (the occupant is in the common-area; (6) a location-change entity (e.g. the occupant has moved from the bedroom to the common-area); (7) a detailed-activity entity (e.g. toilet use); and (8) an ADL entity (e.g. nighttime bathroom use). Each of these may be uncertain with respect to its actual occurrence and/or duration (for example, if it were uncertain that the occupant was in the bedroom to start with, than a signal from the common-area motion sensor may not definitively indicate a bedroom->common-area movement).

Consider an analogous e-commerce example: a session-log may indicate that a visitor is currently viewing a NIKON® flash-attachment page. A more complete situation description might be:

The visitor is viewing a NIKON® flash attachment page to determine price.
The visitor is just starting to learn about cameras, with no immediate plans to purchase.
The visitor is a sophisticated, price-conscious shopper.
The page is serving as auxiliary information for another product (camera).
The flash-attachment is serving as a representative of the brand (NIKON®).

Figure 2:
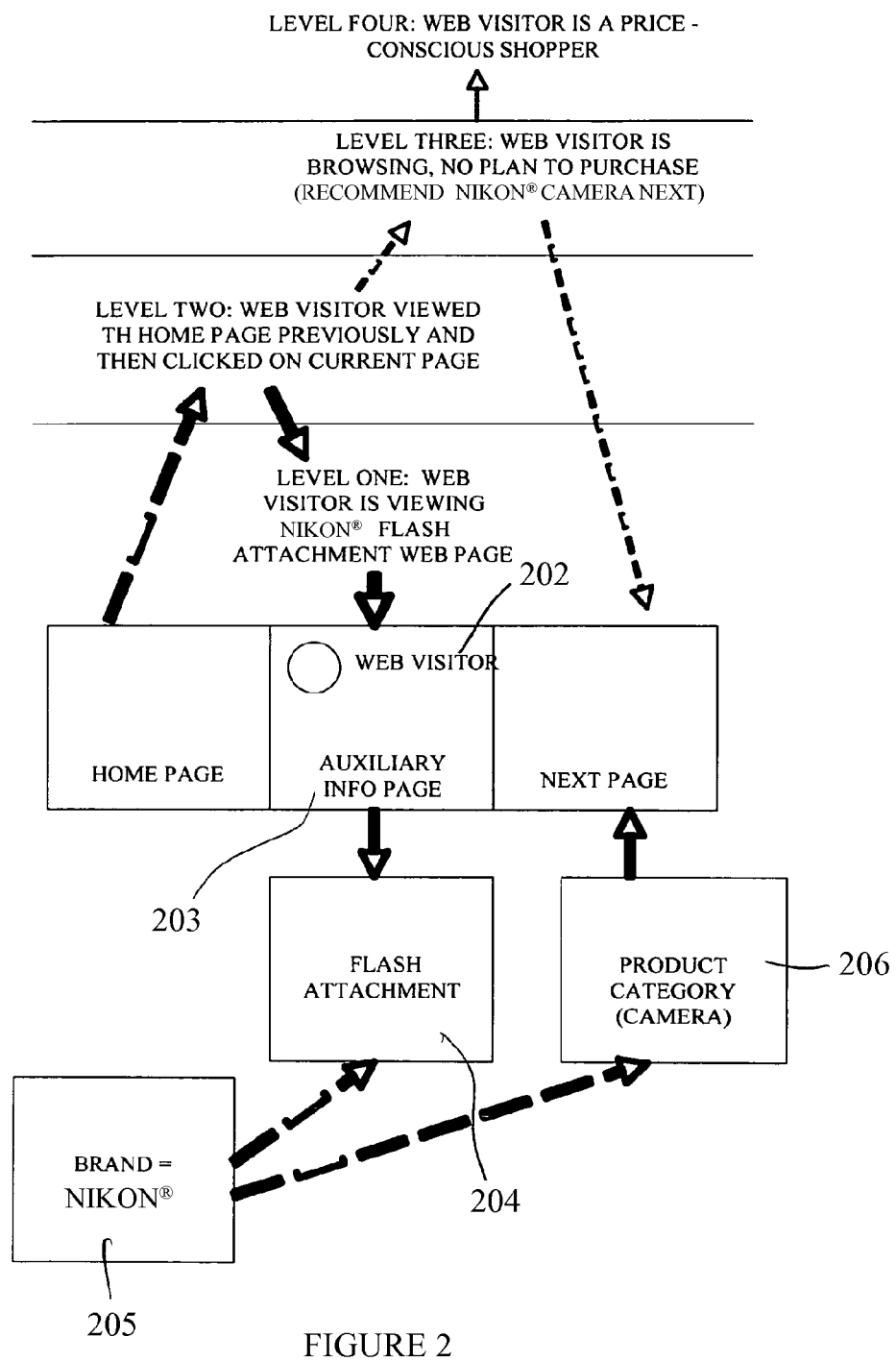
FIG. 2 illustrates another relational model.

FIG. 2 illustrates another relational model. There are seven entities in the above description: (1) the web visitor 202; (2) the website session the web-visitor is engaged; (3) the current page-view activity; (4) the page being viewed 203. (5) the flash attachment displayed on that page 204; (6) the NIKON® brand 205; and (7) the camera product category 206. Each of these entities is uncertain with respect to its actual role/purpose as a component of the visit, and all are interrelated (and, indeed, related to all other page views in this session, all other page views by this visitor, all other views of this product). Current tracking methods are incapable of modeling these interrelationships and performing tracking (filtering, estimation of the unobserved parameters) of visitor, session, page-view state, and the roles of the product, brand, and category entities in the visit, as new page-views arrive.

Figure 3:
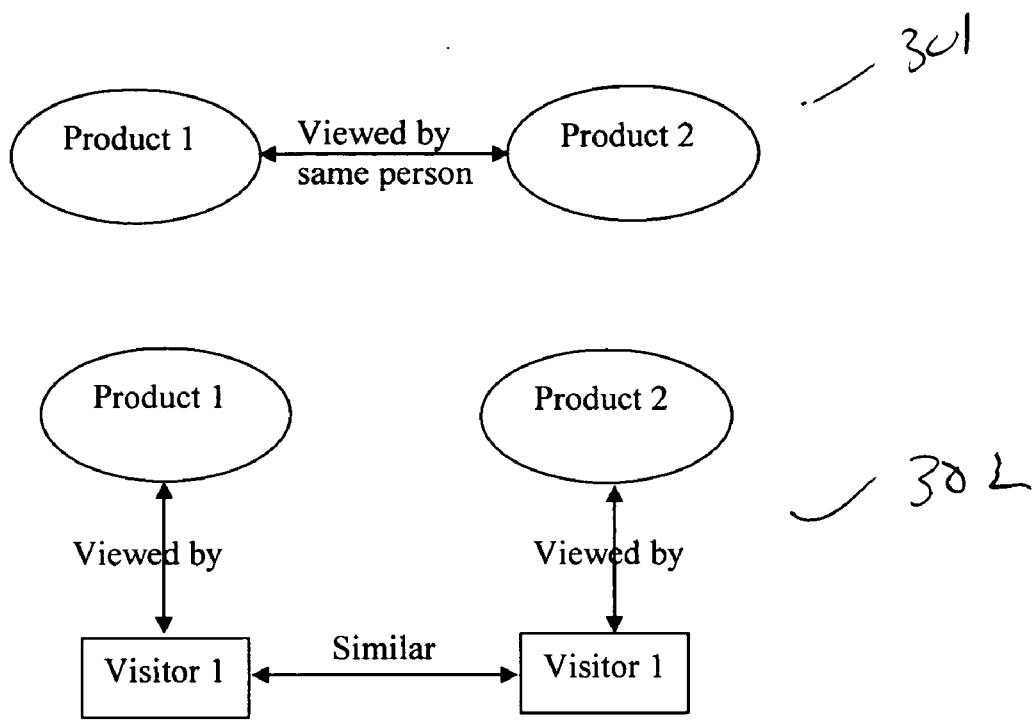
FIG. 3 illustrates collaborative filtering.

There has been work in relational tracking, specifically (Singhai and Domingos, 2003). This work has focused on the issue of detecting the emergence of new entities (e.g., if we assemble wheels, chassis, and body, in the next time-step we will have a car), and does not present specific inference algorithms applicable to the high volume real-time data-streams of concern here. There are two specific technologies that have been used for selecting items for recommendation in an e-commerce setting in the past. One is what is typically called collaborative filtering. The idea of collaborative filtering basically is if a visitor is looking at a particular product and you know or perhaps bought a particular product or looking at a particular item and you've seen other visitors in the past look at that item or purchase that product and those visitors looked at a second product then you might make the assumption that the visitor currently might also be interested in that second product or second item. FIG. 3 illustrates collaborative filtering. This process can be done directly product to product 301, or by finding similar visitors and then recommending products similar visitors have liked 302. In either case, that requires a couple of things. First of all it requires that the visitor of interest has looked at some number of products in order to start the process. Second, it requires that each product has been looked at a fair number of times by a variety of visitors in order to be able to project into products that were also looked at. The method focuses on the items in the catalog as instances and a single relationship among items in the catalog, the relationship of having been viewed or purchased in the same session or by the same visitor. This method is unable to incorporate any information beyond basic item view or purchase information. It can incorporate neither attribute information (e.g. product price) nor additional relational information (e.g., two products are the same brand).

Figure 4:
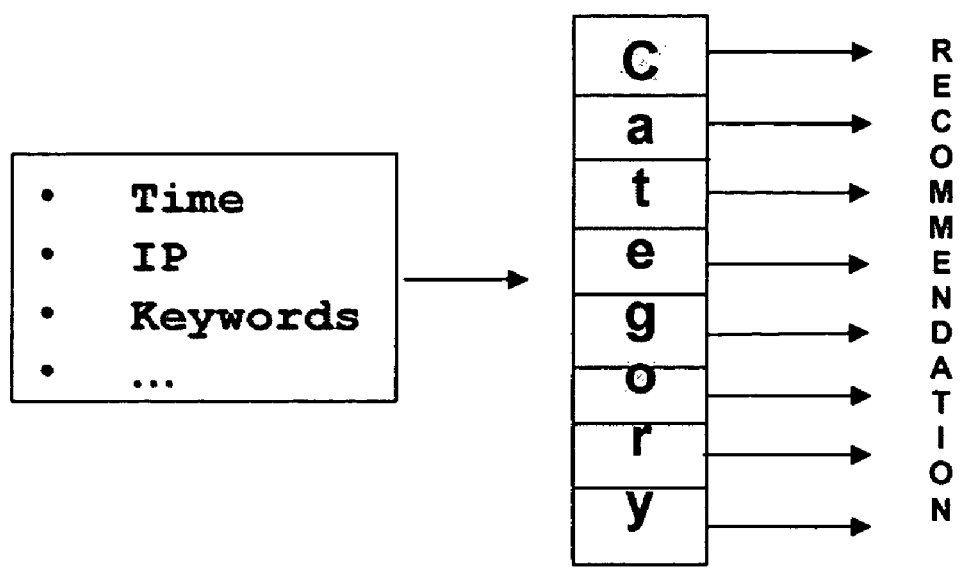
FIG. 4 illustrates behavioral targeting.

A second approach focuses more on the visitors and is typically called behavioral targeting. In behavioral targeting, what's done is to look at a set of attributes, sort of point-in-time attributes of an individual observation (individual visitor). What is known about that visitor? Things obtained, for example, from a reverse IP lookup, like the connection speed, or the location in geographic region, zipcode, perhaps the income in that zipcode—things like that. What's done there is to learn, through the collection of a large amount of data how visitors with those different parameters vary in their responses to different stimuli, or different responses that the system might make, and to learn some sort of categorization that maps from the observable visitor parameters to the possible responses. FIG. 4 illustrates behavioral targeting. This method is most popular in the advertising community where there is a relatively small number of responses. The important point to note is that it is looking at a set of observables at a point in time. One can always include some observables that make explicit some aspect visitor history. However, this prior art becomes computationally intractable as one increases the number of pieces of information to be considered, and is subject to all the limitations of classification methods in general.

The present invention includes a human/machine-readable representation for a Dynamic Relational Bayesian Network (DRBN), together with algorithms for efficient inference in DRBNs and for detecting and terminating instances of dynamic entities and relations in response to real-time events.

Innovation: Dynamic Relational Bayesian Network Representation

Figure 5:
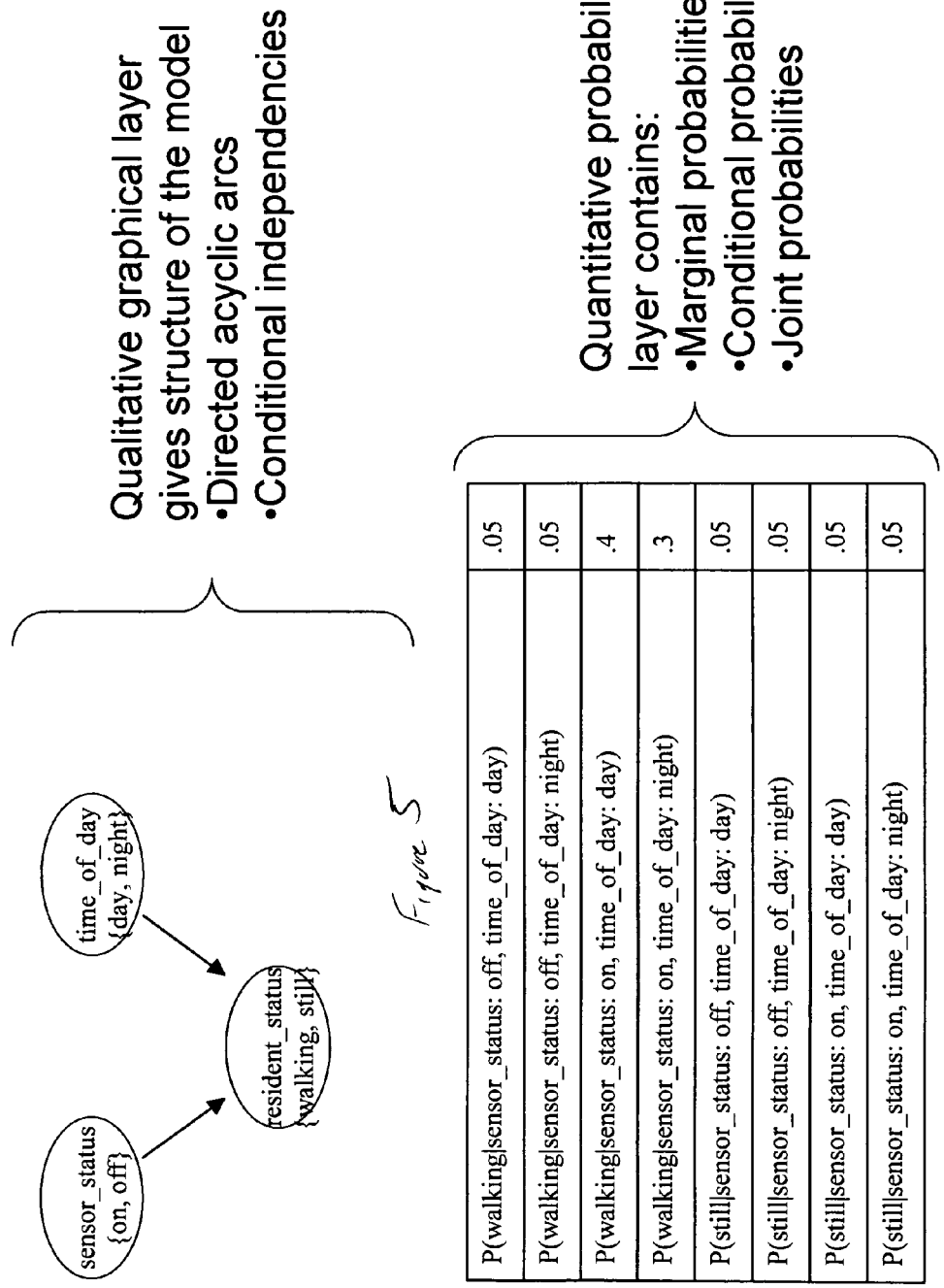
FIG. 5 illustrates a representation of a Bayesian network.

FIG. 5 illustrates a representation of a Bayesian network. Given a set of statistical random variables for a problem, each node in the graph represents one of the random variable (e.g., whether a sensor is reporting motion or not, the time of day, etc). A set of probabilities must be provided with each node. The set of arrows impinging on a node define the probability information that must be provided: for a node with no impinging arrows (called a "root" node), a probability must be provided for each value the associated random variable can take. For a node with impinging arcs such as "resident status", a probability must be provided for each value of the associated variable, for each possible combination of values of the variables at the tails of the arcs.

Figure 6:
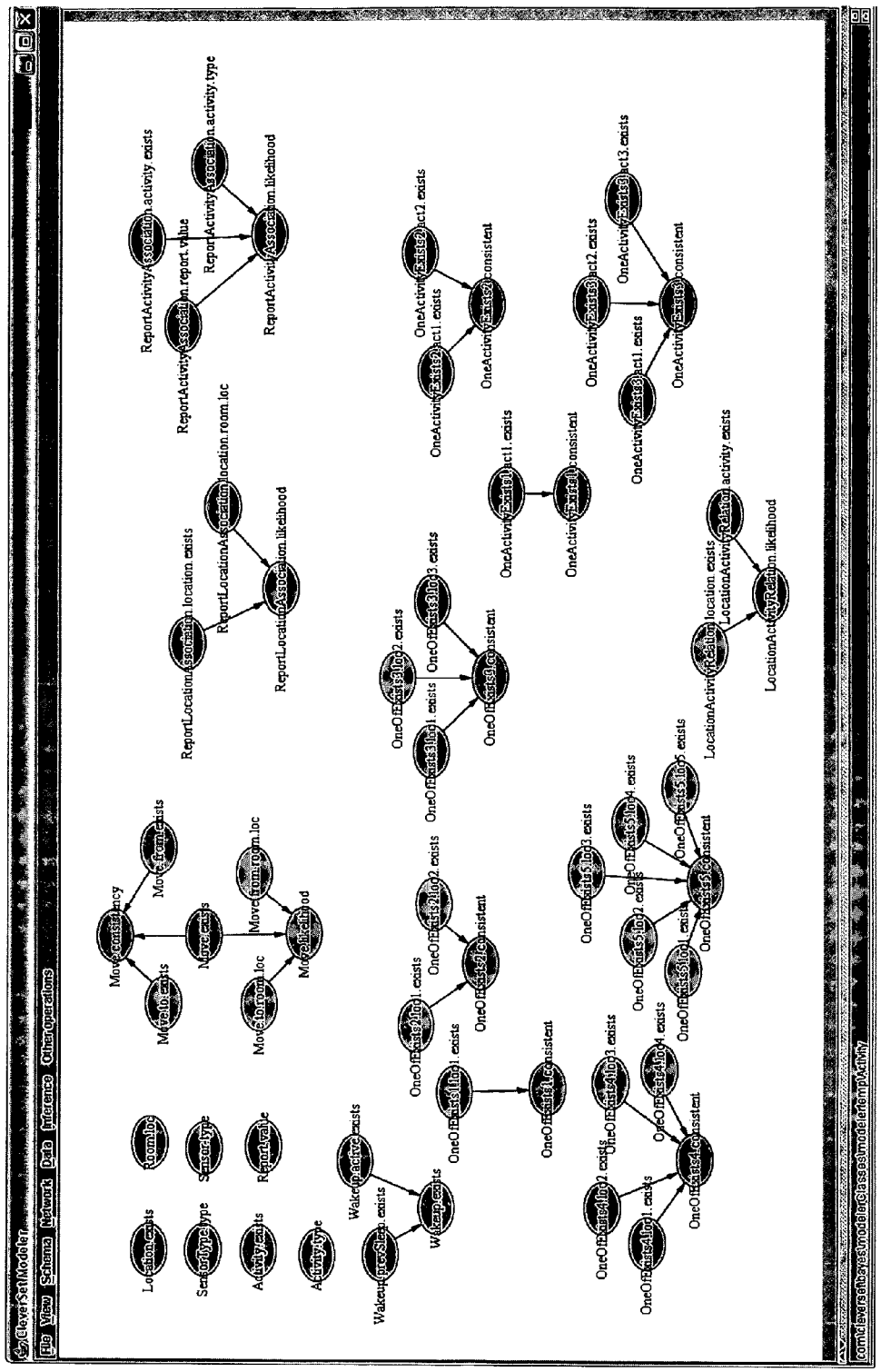
FIG. 6 illustrates a relational Bayesian network.
Figure 7:
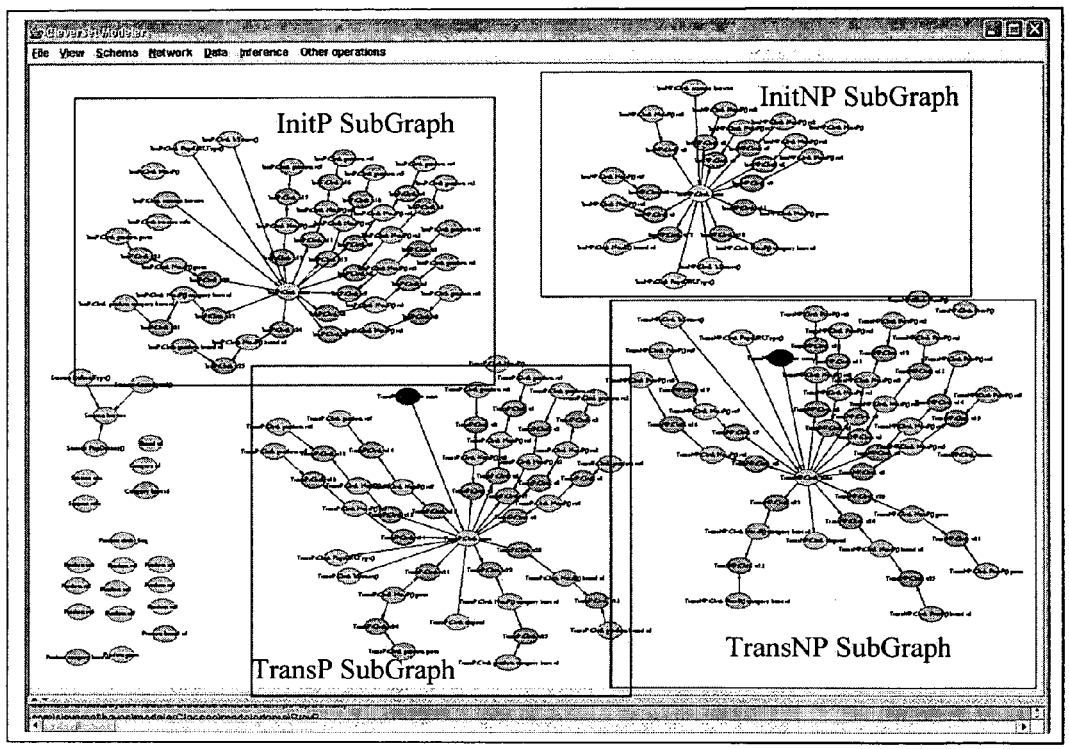
FIG. 7 illustrates a sub-graph model.

Relational Bayesian Networks extend this representation by allowing the nodes to represent, not just a fixed set of pre-defined random variables such as whether the occupant is stationary or walking, but structured queries over an underlying relational data model. FIG. 6 illustrates a relational Bayesian network. For example, in our elder monitoring example, the relational data model includes a location entity that represents the event of an occupant being in a room for a period of time. An RBN random variable might then be, for example, the total amount of time the occupant has spent in a particular room in the last 24 hours. Our DRBN representation is based on our RBN representation, which includes the use of a synthetic variable language. Two aspects of this representation are relevant to the current application. First, the overall model is separated into sub graphs. FIG. 7 Each subgraph is associated with a specific table in the relational data model. For example, in FIG. 7, the top-center sub graph is associated with the "Click" table. All it's node labels are queries that begin at the "Click" table. However, the actual random variable being referred to may not be resident in this base table. For example, the node "Click.session.browse" refers to the "browse" variable in the session associated with the current page view. This becomes relevant when we realize there may be many page-views comprising a single session— they all refer to and share the same single instance of the session.browse variable.

In currently-available methods, a single sub-graph is used for each table (entity) in the relational data model. The present invention extends this with the ability to define multiple sub-models for a class (entity or relation), and associate a condition of applicability, expressed as a Boolean-valued synthetic variable, to each submodels. Only those models for which the applicability condition evaluates to true are applied to each instance. For example, consider a page-view model for a web-visit data model. It might be useful to include details about the product being viewed when the page is a product-detail page, but there are many website pages that do not describe any specific product (e.g., the site homepage, high-level browsing pages, checkout pages, and so on). The innovation permits the user to describe two separate page-view models, one for pages that show specific products, and one for those that do not.

In currently-available methods, there is no distinction between entities that persist, such as products in a product catalog, and those that are only of transient interest, such as page-views (relevant only while a session is active). Filtering algorithms rely on the ability to identify transient entries whose storage can be reclaimed when no longer of interest (e.g., when a session ends). The innovation allows classes are labeled as static, dynamic, or dependent. In addition, individual nodes in a subgraph can be tagged as import, export, and/or update. The import tag is an indication that instance variables associated with the node will be contained in database instances other than the primary referent instance of the subgraph. The export tag indicates that an instance variable will be referred to in a subgraph whose referent instance is other than the data instance defining the variable. The use of this labeling will be described in the filtering algorithm description below.

Innovation: Efficient inference in DRBNs

In currently available methods, it is standard to transform a Bayesian network into a more efficient compiled representation (oin tree-Lauritzen and Speiglehalter, 1988; Li and D'Ambrosio, 1999). This representation can then be reused for multiple queries. While these methods have been extended for use in filtering algorithms (real-time tracking using non-relational Dynamic Bayesian networks), the general problem of inference in Dynamic Relational Bayesian networks remains unsolved. The present invention provides two innovations: (1) a method for efficient inference in DRBNs, which we use as a basis for both parameter estimation (offline model learning) and filtering (on-line visitor tracking); and (2) an extension of the method in (1) to reclaim storage in on-line application of the method.

Step 1: DRBN Compilation

Figure 8:
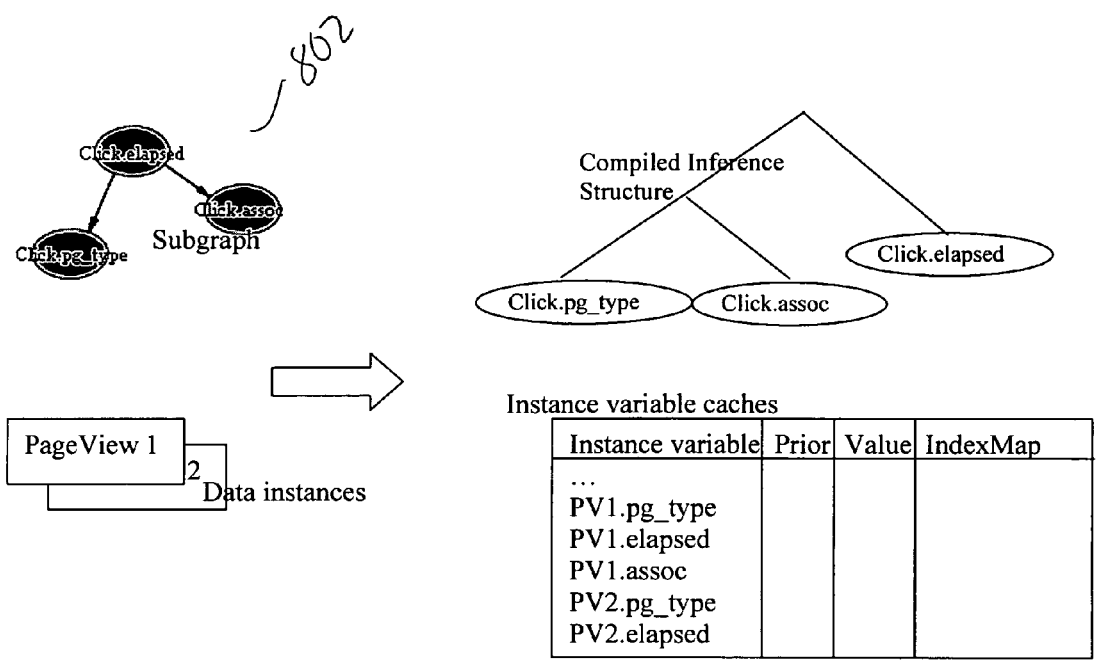
FIG. 8 illustrates a reduced graph and a set of instance node caches.

The present invention provides two elements: a reduced graph and a set of instance node caches. FIG. 8 illustrates a reduced graph and a set of instance node caches. The reduced graph 802 is a copy of the DRBN in which each observed variable (variable whose value is known for every data instance) is reduced to a singleton domain. Prior art has performed this optimization, but only for queries involving a single instance, not for use in repeated inference over multiple instances. Each subgraph in this reduced copy is then compiled to compute all marginals and subjoints, applying a variant of the methods of Bloemeke and Valtorta (1998). Records are maintained of the source of each intermediate and final result, enabling rapid memory-allocation-free, re-evaluation of the compiled model. Note that this compilation process happens only once for each subgraph in the DRBN, independently of the size of the associated data-set.

Step 2: Iteration Over Instances

The present invention provides a method for efficiently applying the compiled inference structures to each data instance. This consists of two innovations: (1) a mapping between data instances and the compiled inference structures; (2) a method of communicating between compiled inference structures to accomplish overall inference and an iteration order; and (3) a method for reclaiming storage during on-line filtering.

A Mapping Between Data Instances and the Compiled Inference Structures

An inference cache is constructed for each subgraph variable, for each data instance to which the subgraph applies. For example, if there is a subgraph that applies to page-views that show a product, there are two such page-views in the dataset, and there are four variables in this subgraph (say, time-on-page, product-price, session-browse (unobserved), and page-intent (unobserved)), then a total of 8 inference caches will be constructed, one for each of the (2) pages*(4) variables. Each cache record includes: (1) the node posterior; (2) the product of any received likelihood messages; (3) the likelihood message sent to the node parent (if the variable is actually resident in another instance as discussed earlier); (4) the node value (if observed); and (5) an array of indices. Note that cache elements are constructed even for variables that are resident in other data instances. This results in automatically creating a separate likelihood store for each child of the instance node. The array of indices maps from the full distribution defined in the original DRBN node to the subdistribution needed for inference given the observed values for this data instance node and its parents. These arrays are themselves uniquified to save memory, and permit very rapid replacement of the probability tables in the compiled reduced class graph as it is re-used for each instance.

A Method of Communicating Between Compiled Inference Structures to Accomplish Overall Inference and an Iteration Order.

Currently available methods include Generalized Loopy inference (Yedida et al., 2000), an inference algorithm in which exact inference is used within small local clusters of nodes, and loopy belief propagation (Pearl, 1988) is used between clusters. The present invention provides: (1) the use of DRBN subgraphs as the node clusters; and (2) the use of a unique ordering of cluster evaluation. GLI only requires that all subgraphs be evaluated each iteration, but does not specify an order in which this evaluation occur. For Dynamic models, conversion rate is highly sensitive to evaluation order. The present invention orders instances by time order, and reverse the order of instance application for each loopy pass. This essentially effects a "forward-backward" algorithm that works well for parameter estimation and filtering for DRBNs.

A Method for Reclaiming Storage During On-Line Filtering

Currently available methods include methods for reusing inference structures in simple linear models such as Dynamic Bayesian Networks (DBNs—Kjæwrulff, 1992; DBNs—Boyen and Koller, 1999). In these models there is a clearly identified subgraph that can be reused for each new time-step. These currently available methods do not apply to DRBNs, which do not have such a simple linear structure. The present invention relies on the subgraph tags described earlier ("Static", "Dynamic", "Dependent"). Storage reclamation is accomplished by checking, following GLI over new instances, of all instance node caches where: (1) the instance is of a class labeled "dynamic"; and (2) has any nodes labeled "import" AND "update". If this is the case, then the instance containing the variable corresponding to the identified import node is located and the procedure is recursively applied. This procedure is repeated n times, where n is a parameter of the algorithm. The instance at the end of this recursion, if any, is scavenged: that is, all of its node caches, as well as all of the node caches for any nodes that are children of a scavenged node and are owned by instances of classes labeled dynamic or dependent. No special inferential computation need be done since remaining nodes, if they are children of scavenged nodes, already have posterior marginals (a property of GLI), and if parents, already have the likelihood from the scavenged child incorporated into the parent likelihood.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computer-implemented method for modeling, filtering/tracking of real-time behavior of a system, comprising the steps of:

identifying variables in a dynamic relational Bayesian network (DRBN) to be filtered, the DRBN including a plurality of submodels, the DRBN being stored in a memory;

assigning a characterization to the variables to be filtered;

creating a reduced graph for each submodel of the DRBN by reducing each observed variable to a singleton domain;

compiling on a computer each reduced graph to create compiled inference structures;

creating a mapping between data instances and the compiled inference structures by constructing an inference cache for each variable of the reduced graph for each data instance to which the reduced graph applies;

performing on a computer exact inference over each data instance using a generalized loopy inference method to communicate estimate changes between instances for each loopy pass, wherein the data instances are time ordered and the order of instance application is reversed for each loopy pass.

2. The method of claim 1, wherein the characterization is a Boolean characterization.

3. The method of claim 1, wherein the DRBN includes a plurality of classes of submodels, each class having a plurality of submodels, and wherein each of the submodels for each class is associated with a condition of applicability, and wherein at least some nodes of some submodels are labeled as import and update; and wherein the method further comprises the steps of classifying each of the submodels (or classes) as static, dynamic or dependent;

following loopy inference over each new instance, for all inference node caches where the instance is of a submodel for class* labeled dynamic and has a node labeled import and update, locating the instance containing the variable corresponding to the node labeled import;

repeating the locating step n times; and scavenging the instance located in the nth locating step.

4. The method of claim 1, wherein the instances are historical data instances and the inference is used for parameter estimation.

5. The method of claim 1, wherein the instances are real time data instances and the inference is used for filtering.

6. The method of claim 1, wherein the DRBN is a model of a web visit.

7. The method of claim 1, wherein the DRBN includes a page view class of submodels, and wherein the page view class includes at least one first submodel of a page view of a page showing a specific product and at lease one second submodel of a page view of a page not showing a specific product.

8. The method of claim 1, wherein the system is in-residence patient behavior.

9. The method of claim 1, wherein the system is a collection of moving, physical targets.

10. The method of claim 1, wherein the system is a visitor on a website.

\* \* \* \* \*

UNITED STATES PATENT AND TRADEMARK OFFICE
CERTIFICATE OF CORRECTION

PATENT NO. : 7,809,661 B2
APPLICATION NO. : 11/543728
DATED : October 5, 2010
INVENTOR(S) : Bruce D'Ambrosio Page 1 of 1

It is certified that error appears in the above-identified patent and that said Letters Patent is hereby corrected as shown below:

At column 1, line 14, insert the following:

-- GOVERNMENT FUNDING

This invention was made with Government support under Contract No. W31P4Q-04-C-R239 awarded by the U.S. Army Aviation & Missile Command. The Government has certain rights in the invention. --

Signed and Sealed this
Twenty-first Day of February, 2012

David J. Kappos
*Director of the United States Patent and Trademark Office*